Oct. 23, 1962 R. D. KELL 3,060,422
INDICATOR AND/OR CONTROL SYSTEM
Filed Nov. 29, 1941 3 Sheets-Sheet 2
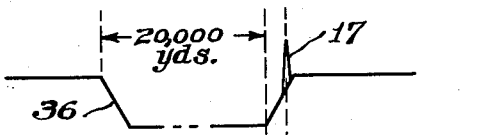
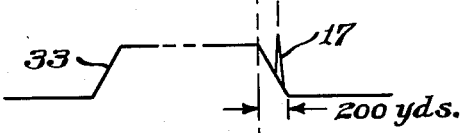
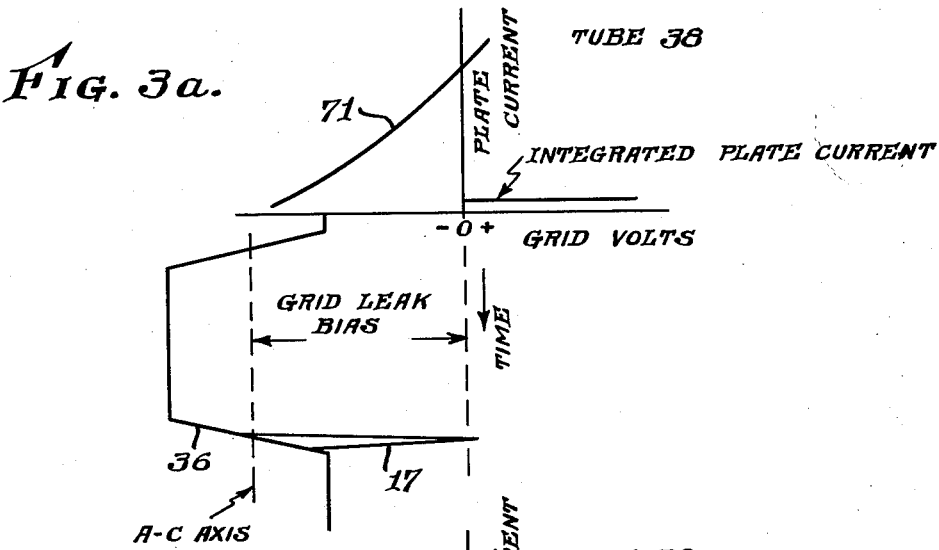
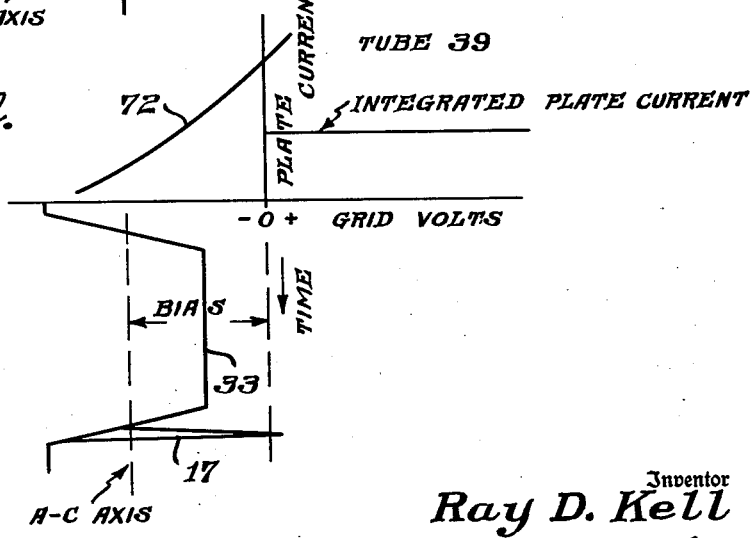
Inventor
Ray D. Kell
Attorney Oct. 23, 1962

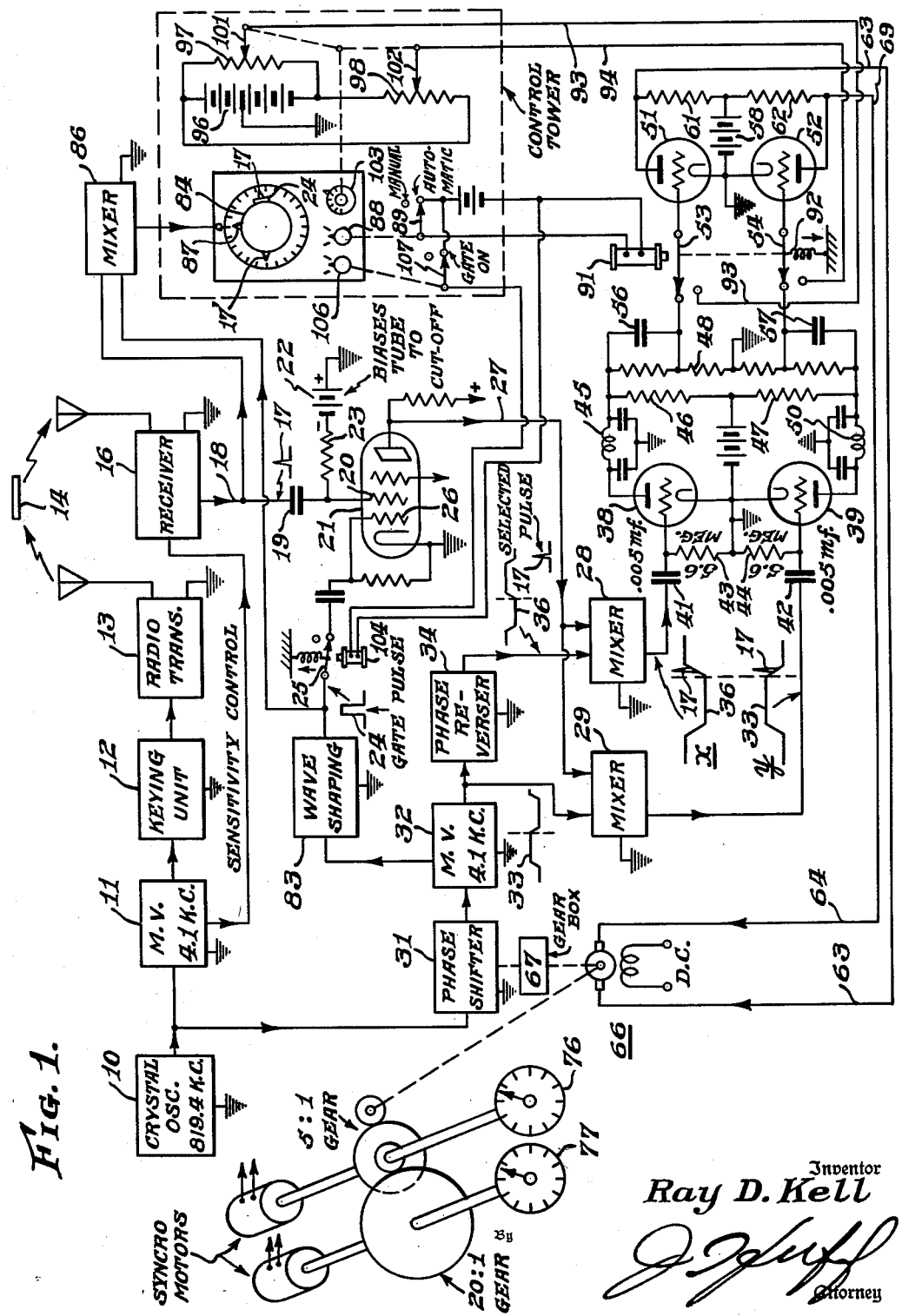

R. D. KELL 3,060,422

INDICATOR AND/OR CONTROL SYSTEM

Filed Nov. 29, 1941

Inventor
Ray D. Kell
By
Attorney

United States Patent Office 3,060,422
Patented Oct. 23, 1962

3,060,422
INDICATOR AND/OR CONTROL SYSTEM
Ray D. Kell, Haddonfield, N.J., assignor to Radio Corporation of America, a corporation of Delaware
Filed Nov. 29, 1941, Ser. No. 421,071
24 Claims. (Cl. 343—7.3)

My invention relates to the art of electrical control and particularly to methods and systems for determining and/or indicating range or distance, or for synchronizing electrical circuits or apparatus.

The invention will first be described particularly with reference to an automatic range control system for antiaircraft guns.

As applied to gun fire control, one object of the invention is to provide an improved indicator and/or automatic control for range.

A further object of the invention is to provide an improved method of and means for determining and/or indicating the range or distance of an object.

A further object of the invention is to provide an improved method of and means for positioning a mechanical element automatically in accordance with the range or distance of a remote object.

A further object of the invention is to provide in a range finder of the type utilizing reflected radio pulses an improved method of and means for selecting from a plurality of reflected pulses the particular pulse that it is desired to utilize for control or indicating purposes.

A still further object of the invention is to provide an improved method of and means for synchronizing mechanical elements such as color filter wheels or scanning discs.

A still further object of the invention is to provide an improved method of and means for synchronizing deflecting circuits in a television system or the like.

In a preferred embodiment of the invention as employed for range indication and automatic gun fire control, the output of a crystal oscillator is divided in frequency to obtain a signal which keys a high frequency radio transmitter for producing the desired transmitted pulses. If these pulses strike an object, such as an airplane or warship, they are reflected back to a receiver where they may be amplified and supplied to a control circuit. The time interval between the instant the pulse leaves the transmitter and the instant it reaches the receiver after reflection is a measure of the distance to the object.

The time interval is determined by adding in a suitable mixing circuit the received pulse and a pulse having a known time or phase relation to the transmitted pulse. The latter pulse may be obtained by passing signal from the crystal oscillator through an adjustable phase shifter coupled to a motor and then dividing the frequency by means of a chain of multivibrators or the like to obtain rectangular pulses recurring at the same frequency as the transmitted (and received) pulses.

The rectangular pulses have steeply sloping sides so that, when the reflected pulses are mixed therewith in a mixing circuit, a selected reflected pulse can be made to "ride" on one of said steep sides by so adjusting the phase shifter that the rectangular pulses and the reflected pulses occur in the proper phase relation. Rectangular pulses of reversed polarity and the selected reflected pulses are also supplied to a second mixing circuit where they are added.

The outputs of the two mixing circuits are supplied to grid-leak biased amplifier tubes that function as peak rectifiers and which have their output circuits connected in balanced relation so that their direct current output is zero when the peak values of the two applied signals with respect to their A.-C. axes are the same. If these peak values are not the same, the resulting D.C. output will drive the motor connected to the phase shifter and the circuit will automatically be brought into balance. The position of the phase shifter determines the position of a pointer on a calibrated scale which, at this condition of balance, indicates the range of the object that is reflecting the pulses. Also, the said motor preferably drives synchro motors such as selsyn motors or the like for supplying the range to a computer.

The system, when employed as a range finder, also preferably includes means for selecting the desired one of a plurality of reflected pulses and for keeping the system automatically under the control of this selected pulse. Thus a gun may be aimed at a particular airplane, for example, and the gun will continue to follow it automatically even though other airplanes fly close to the one selected.

The invention will be better understood from the following description taken in connection with the accompanying drawing in which FIGURE 1 is a circuit and block diagram of one embodiment of the invention as applied to a range finding system for indicating range and for automatically and continuously supplying the range to a computer or the like.

FIGURES 2a and 2b are graphs showing the outputs of mixer circuits in FIG. 1,

FIGURE 2c shows a gate pulse utilized in the circuit of FIG. 1,

Figure 4:
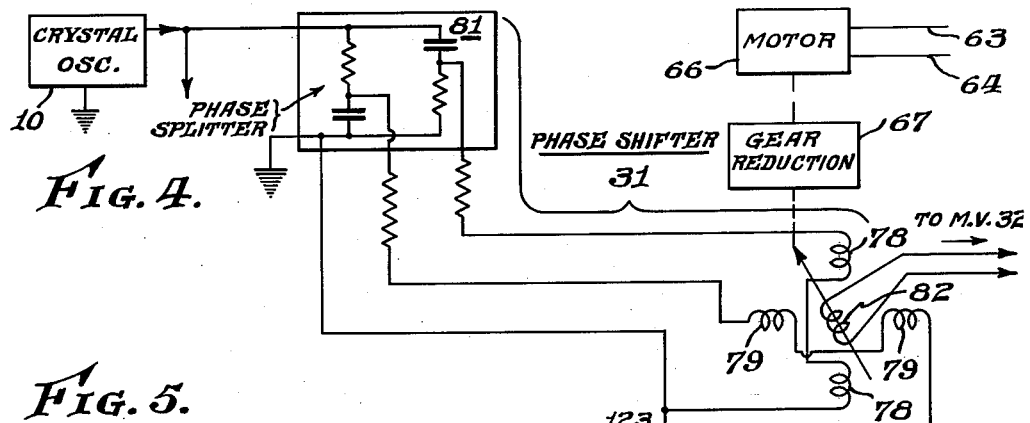
Figure 5:
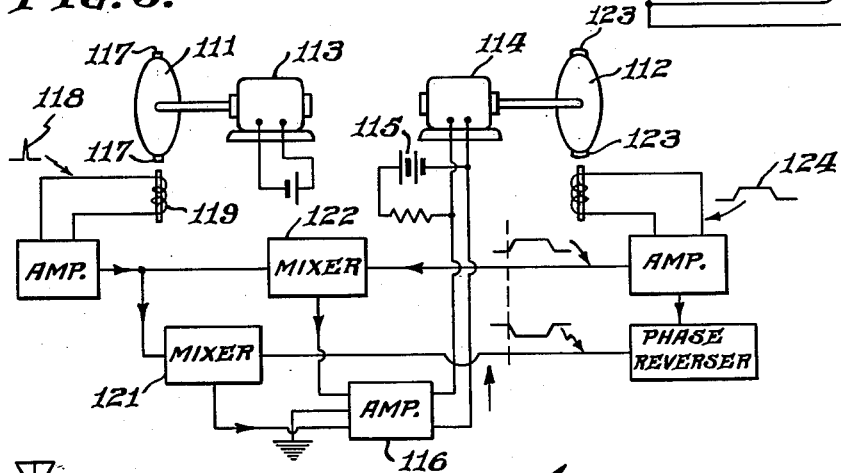
Figure 6:
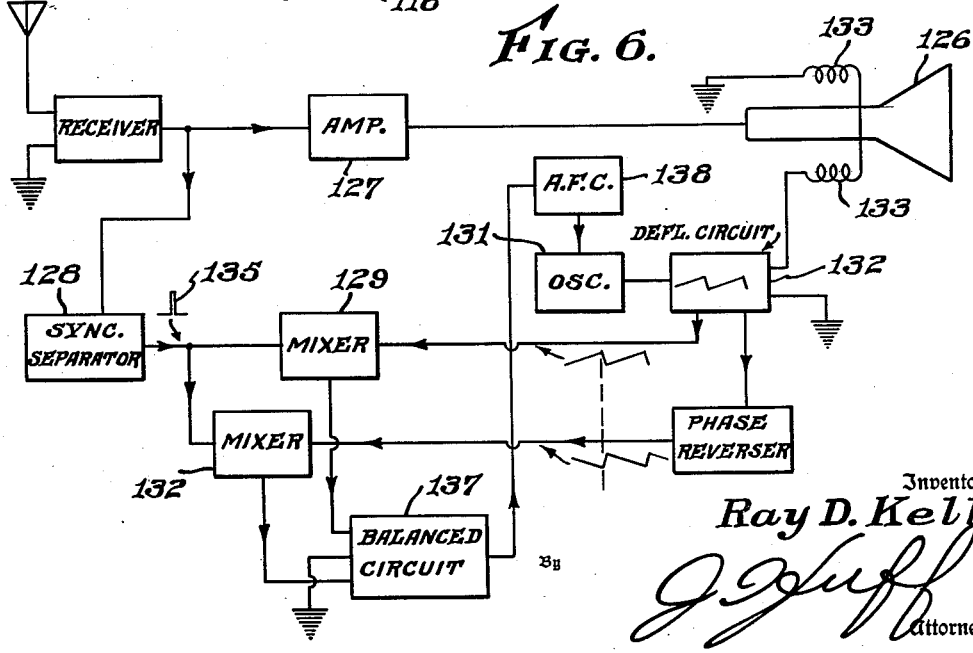

FIGURES 3a and 3b are graphs showing the operation of the balanced peak rectifiers in FIG. 1, FIGURE 4 is a circuit diagram of the phase shifter in FIG. 1, FIGURE 5 shows an embodiment of the invention as applied to a synchronizing system for color discs or the like, and FIGURE 6 shows an embodiment of the invention as applied to a television receiver deflecting circuit for synchronizing the receiver scanning with the transmitter scanning.

In the several figures corresponding parts and curves are indicated by the same reference characters.

In FIGURE 1, a crystal oscillator operating at 819.4 kilocycles is indicated at 10. Its output is supplied to a suitable frequency divider 11, which may be a chain of multivibrators, to divide the frequency by 200 and produce pulses occurring at the rate of substantially 4.1 kc. per second. The 4.1 kc. pulses are applied to a keying unit 12 for keying a high frequency radio transmitter 13 whereby it radiates 4.1 kc. pulses of high frequency energy that will be reflected from an airplane or other distant object indicated at 14.

The reflected pulses of R-F energy are received by a suitable receiver 16 and detected to produce the 4.1 kc. pulses indicated at 17 which are supplied over a conductor 18 and through a coupling condenser 19 to the grid 20 of a vacuum tube 21. The tube 21, in the example illustrated, is biased to plate current cut-off by means of a biasing battery 22 which applies a negative bias to grid 20 through a grid resistor 23.

As will be explained, a pulse 17 can pass through the tube 21 only when it is unblocked by a "gate" pulse 24 applied through a switch arm 25 to a grid 26 of tube 21. If a pulse 17 is received while the tube 21 is unblocked, it will pass over a conductor 27 to mixer circuits 28 and 29.

Referring now to the portion of the circuit for determining the time elapsed between transmission and reception of a pulse, signal from the oscillator 10 is passed through a phase shifter 31 to a frequency divider 32, which may be similar to the frequency divider 11, for producing 4.1 kc. rectangular pulses having steeply sloping sides as shown at 33. These pulses are supplied to the mixer 29.

Pulses from frequency divider 32 are reversed in phase by a suitable phase reversing means indicated at 34 to produce the pulses shown at 36. These pulses are applied to the mixer 28.

The outputs of mixers 28 and 29 are shown at $x$ and $y$, respectively, as they appear for a balanced condition of the system. These outputs are also shown in FIGS. 2a and 2b as they appear for a certain unbalanced condition. It will be noted that for the balanced condition (explained hereinafter) the pulses 17 are positioned halfway up on oppositely sloping sides of the pulses 36 and 33 whereby the peak of pulse 17 has the same amplitude at $x$ as at $y$.

As indicated in FIGS. 2a and 2b, the ratio of one-half cycle of the rectangular pulses to a steeply sloping side of a pulse is 100 to 1 in the example being described. No attempt has been made to draw the pulses shown in the several figures to scale.

The outputs of mixers 28 and 29 are supplied to vacuum tubes 38 and 39, respectively, through grid condensers 41 and 42. Grid leak resistors 43 and 44 are provided which have sufficiently high resistance for a given capacity of the grid condensers to make most of the charge on the grid condensers (resulting from grid current flow) hold over between successive recurring signal peaks 17 whereby the tubes function as peak rectifiers. This type of grid leak biasing action in itself is well known. Condenser and resistor values are indicated in microfarads and megohms in FIG. 1 merely by way of example.

The plate circuits of tubes 38 and 39 are connected in balanced relation, plate voltage being supplied through plate resistors 46 and 47 and through filters 45 and 50. These filters cut off at 4 kc. and integrate the output of tubes 38 and 39 to give a steady D.-C. output. A voltage divider 48 having a grounded midpoint is connected between the plates of tubes 38 and 39 for supplying direct current control potentials to the control grids of D.-C. amplifier tubes 51 and 52.

The grids of tubes 51 and 52 are connected through switch arms 53 and 54, respectively, to the voltage divider 48 on opposite sides of the grounded midpoint. The upper and lower end sections of divider 48 are shunted by condensers 56 and 57 for the purpose of providing a first derivative voltage component to prevent overswing and hunting of the motor 66 as is well known in the art.

The plate circuits of the tubes 51 and 52 are also connected in balanced relation, plate voltage being supplied by a battery 58 or the like through plate resistors 61 and 62. This balanced D.-C. amplifier has its output circuit connected through a pair of conductors 63 and 64 to a direct current motor 66.

If the mixer outputs are as shown at $x$ and $y$, and if the circuits of the peak rectifier 38—39 and D.-C. amplifier 51—52 are properly balanced, there will be no flow of current to the motor 66. If, on the other hand, the time or phase relation between pulses 36 and 37 and the reflected pulses 17 is different than that shown at $x$ and $y$ (is like that shown in FIGS. 2a and 2b, for example), then current will flow to motor 66 and the phase shifter 31 will be driven through a gear reduction unit 67. As will appear from the following description, the phase of the pulses 33 and 36 is thus either advanced or retarded with respect to the pulse 17 depending upon the direction of rotation of the motor 66 as determined by the direction of unbalance of the peak rectifier and D.-C. amplifier circuit.

FIGS. 3a and 3b show the grid voltage-plate current characteristic curves 71 and 72 of the peak rectifier tubes 38 and 39, respectively. The voltages applied to the grids of these tubes are shown at 17—36 and 17—33, respectively. It will be understood that, because of the long time constant of the grid condenser-grid leak resistor circuit, the peak of the pulse 17 will extend into the region of positive grid volts by only a slight and almost constant amount. The amount of grid leak bias developed is such as to maintain this condition. Any tendency of the peak of pulse 17 to extend further into the positive grid region results in an increase in grid leak bias whereby the movement into the said region is stopped.

Comparing the two conditions at tube 38 and at tube 39 as shown by FIGS. 3a and 3b, it will be seen that the integrated plate current in tube 38 is less than that in tube 39 whereby unequal voltages are applied to the D.-C. amplifier 51—52. Consequently, its output to the motor 66 will not be zero and the motor will be driven in a certain direction to adjust the phase shifter to a point where the peaks of pulses 17 are the same height above the A.-C. axis at tube 38 as at the tube 39. In other words, the system is automatically brought to the condition of balance illustrated in FIG. 1 at $x$ and $y$.

It will be apparent from the foregoing that the position of the phase shifter at the above-mentioned condition of balance gives the time relation between the reflected pulses 17 and the time reference pulses 33 and 36. This, of course, gives the distance from the transmitter to the reflecting object 14 since radio waves travel at a known fixed speed; and the distance can be shown on properly calibrated dials such as the dials shown at 76 and 77, the two dials being for two different maximum ranges.

The pointers of dials 76 and 77, in the example illustrated, are driven by the motor 66 through suitable reducing gears as indicated on the drawing. The same shafts that rotate the dial pointers may be coupled to syncro motors or the like as illustrated for feeding the range information to a remotely positioned computer (not shown).

The phase shifter 31 may be of any suitable type such as that shown in FIG. 4 by way of example. It comprises a stator consisting of coils 78 and 79 positioned at right angles to each other and supplied with current from a phase splitter 81 so that the current in the coils 78 is substantially 90-degrees out of phase with the current in the coils 79 whereby a rotating field is produced. A rotor coil 82 is mechanically coupled through the gear reduction unit 67 to the motor 66 so that it may be rotated to different angular positions by operating the motor. In this way, the voltage induced in rotor coil 82 and supplied to the frequency divider 32 may have its phase either advanced or retarded a known amount with respect to the voltage supplied to the frequency divider 11 (FIG. 1) by the crystal oscillator 10.

At this point the reason for starting with a frequency of 819.4 kc. and dividing by 200 instead of simply starting with a frequency of 4.1 kc. may be noted: It gives a very exact vernier control of the phase shift of the rectangular pulses 33 and 36, the accuracy being 200 times greater than would be the case if the oscillator 10 supplied a 4.1 kc. signal to the phase shifter 31. For example, a phase shift of one complete cycle of the 819.4 kc. signal causes a phase shift of only $\frac{1}{200}$ of one cycle at the 4.1 kc. output.

The reason for selecting a figure of 819.4 kc. and 4.1 kc. need not be discussed here except to say that it is arrived at, as is well known in the art, by taking into account both the speed of progagation of a radio wave and the maximum distance from which it is desired to receive reflected waves.

A sensitivity control circuit is indicated in FIG. 1 for applying a gain control voltage pulse to the receiver 16 from the multivibrator chain 11 at the instant a pulse is transmitted whereby any disturbance in the receiver due to direct reception from the nearby transmitter 13 is minimized. In operation, this control circuit lowers the receiver gain at the instant a pulse is transmitted. Between the transmission of a pulse and reception of the reflected pulse, the receiver gain increases at a rate depending upon the time constant of the receiver gain control circuit.

The manner in which the system may be operated by a control officer located at a control tower, indicated by the dotted rectangle in FIG. 1 will be described, with reference to the use of the gate pulse 24. This pulse may be obtained from the frequency divider 32 by means of well known wave shaping circuits indicated at 83. The pulse 24 occurs in a fixed time relation to the pulses 33 and 36, this relation being such that it occurs in phase with the sloping sides of pulses 33 and 36 as shown by comparing FIGS. 2a, 2b and 2c. As previously stated, no signal can pass through the tube 21 unless the gate pulse is on the grid 26 at that time.

At the control tower there is suitable control apparatus to enable the control officer to operate the phase shifter 31 by manual control whereby the gate pulse 24 may be moved under the desired reflected pulse as shown on a cathode ray tube indicator 84. The pulses 33 and 36, of course, are shifted in phase simultaneously with the gate pulse 24 and in a fixed phase relation thereto whereby the selected pulse 17 falls on their steep sides.

The control tower equipment comprises the cathode ray tube indicator 84 which receives both the gate pulse 24, the transmitted pulse and the received, reflected pulses through a mixer 86. The transmitted pulse passes through the receiver since it is not completely blocked by the sensitivity control. The indicator 84 is of a well known type wherein the cathode ray is rotated by deflecting circuits to trace a circular path nad wherein the ray is deflected off its circular path upon the application of a signal to a centrally located radial deflecting electrode ta the screen end of the tube. Thus, there will appear on the fluorescent screen the received reflected pulses as indicated at 17 and 17' the transmitted pulse as indicated at 87, and the gate pulse as indictaed at 24, it being assumed that the pulses 17, 17' are reflected from two different airplanes, for example.

A control knob 88 operates a switch arm 89 which has an "automatic" position and a "manual" position. In the "automatic" position, a battery circuit is closed through a relay coil 91 whereby the switch arms 53 and 54 are pulled against a spring 92 and held in the position illustrated.

To select a particular reflected pulse, such as pulse 17, the switch 89 is moved to the "manual" position whereby the switch arms 53 and 54 are pulled down to the power contact points to connect the grids of D.-C. amplifier 51—52 to a pair of conductors 93 and 94 leading to a voltage source under the control of the control office. This voltage source may comprise a battery 96 having its center point grounded and having potentiometer resistors 97 and 98 connected thereacross.

Adjustable taps 101 and 102, to which conductors 93 and 94 are connected, are mechanically coupled to a control knob 103 so that rotation of this knob moves taps 101 and 102 up and down together, whereby the control officer may rotate the phase shifter rotor either forward or backward until the gate pulse 24 is located under the selected pulse 17 at the indicator 84. At this instant, he switches the system to the "automatic" posiion and the phase shifter will be driven automatically as previously described, the system "following" automatically the object from which the selected pulse 17 is reflected. It has been assumed during the preceding discussion that the gate pulse switch arm 25 has always been closed to apply the gate pulse to the tube 21.

Under certain conditions, as when the antenna system, which is preferably directive, is being rotated (by means not shown) to search for enemy airplanes, it is desired that any received pulse will operate the system automatically. To permit this, the gate switch 25 is opened by deenergizing a normally energized relay coil 104. This is done at the control tower by means of a control knob 106 mechanically coupled to a switch arm 107.

An application of the invention to television is illustrated in FIG. 5, in which two discs 111 and 112 are to be rotated in synchronism by motors 113 and 114, respectively. These discs may be the color filter discs at the transmitter and receiver of a color television system. The motor 114 is a D.-C. motor operated by both a battery 115 and the D.-C. output of an amplifier 116. The disc 111 has narrow projecting elements 117 of magnetic material which produce narrow pulses 118 across a coil 119 wound on a permanent magnet. These pulses are amplified and supplied to mixers 121 and 122. The disc 112 has wider projecting magnetic elements 123 that produce wider pulses 124 having a sloping side on which the pulse 118 may set. These pulses are amplified and supplied to the mixer 122 with one polarity and supplied to the mixer 121 with the opposite polarity.

The mixer outputs are supplied to the balanced amplifier and peak rectifier circuit 116 which may be the same as that shown in FIG. 1. The output of circuit 116 is zero if the discs 111 and 112 are in synchronism and all the driving current for the motor 114 is supplied by battery 115. Current from circuit 116 adds to the battery current if the motor 114 slows down, and subtracts from it if the motor speeds up. Thus synchronism of the discs is maintained.

In FIG. 6, the invention is shown applied to a television receiver for synchronizing a deflecting circuit. The received picture and synchronizing signals are supplied to a cathode ray tube 126 through an amplifier 127. The synchronizing pulses are separated in any suitable manner at 128 to provide narrow synchronizing pulses 135 which are supplied to mixers 129 and 130. The deflecting circuit, which may be for either horizontal or vertical deflection, comprises a blocking oscillator or the like indicated at 131 and a saw-tooth current generating circuit 132 which causes saw-tooth deflecting current to flow through the deflecting coils 133. In order to simplify the drawing, only one of the receiver deflecting circuits is illustrated.

Saw-tooth voltage from the deflecting circuit 132 is supplied to mixer 129 with one polarity and to the mixer 130 with the opposite polarity. The mixer outputs are impressed upon a balanced peak rectifier and amplifier circuit 137 similar to that of FIG. 1. The D.-C. output of circuit 137 is applied to an automatic frequency control circuit 138 of any suitable type which controls the frequency of oscillator 131 in accordance with the magnitude and polarity of the balanced circuit output. If the oscillator tends to oscillate either too fast or too slow, it will automatically be prevented from getting out of synchronism with the synchronizing pulses 135.

It will be understood that while in the above-described embodiments of the invention there are provided pulses, sawtooth waves or the like having steep sides upon which the reflected or synchronizing pulses are to "ride," it may be satisfactory to employ a pair of sine waves of opposite polarity in other embodiments where less accuracy or precision in results is required.

I claim as my invention:

1. In the operation of an apparatus for determining the time interval between the transmission and reception of an electrical pulse, the method which includes producing a pair of electrical reference waves having simultaneously oppositely sloped portions definitely timed with respect to the transmission of said pulse, superimposing the received pulse upon said sloped portions to produce a pair of resultant pulses, and adjusting the time relation between said received pulse and said reference waves to equalize the peaks of said resultant pulses.

2. In the operation of an apparatus for determining the time interval between the transmission and reception of an electrical pulse, the method which includes producing a pair of reference pulses having simultaneously oppositely sloped portions definitely timed with respect to the transmission of said pulse, superimposing the received pulse upon said sloped portions to produce a pair of resultant pulses, and adjusting the time relation between said received pulse and said reference pulses to equalize the peaks of said resultant pulses.

3. The method of determining the time relation between a first electrical pulse and a second electrical pulse which comprises producing a reference pulse having a sloping side and occurring in a known time relation to said first pulse, producing another reference pulse having a sloping side occurring at the same time as said first sloping side but sloping in the opposite direction, mixing said second pulse and said first reference pulse to give an added composite signal, mixing said second pulse and said second reference pulse to give a second added composite signal, deriving a control signal from the first composite signal which is a measure of its peak amplitude, deriving a second control signal from the second composite signal which is a measure of its peak amplitude, and shifting the phase of said reference pulses until the amplitudes of said control signals have a predetermined relation to each other.

4. The method of determining the time relation between a first electrical pulse and a second electrical pulse which comprises producing a reference pulse having a sloping side and occurring in a known time relation to said first pulse, producing another reference pulse having a sloping side occurring at the same time as said first sloping side but sloping in the opposite direction, mixing said second pulse and said first reference pulse to give an added composite signal, mixing said second pulse and said second reference pulse to give a second added composite signal, deriving a control signal from the first composite signal which is a measure of its peak amplitude, deriving a second control signal from the second composite signal which is a measure of its peak amplitude, and shifting the phase of said two reference pulses simultaneously in response to a difference in the amplitude of said control signals.

5. In a system for determining the time relation between a first electrical pulse and a second electrical pulse, means for producing a reference pulse having a sloping side and occurring in a known time relation to said first pulse, means for producing another reference pulse having a sloping side occurring at the same time as said first sloping side but sloping in the opposite direction, means for mixing said second pulse and said first reference pulse to give an added composite signal, means for mixing said second pulse and said second reference pulse to give a second added composite signal, means for deriving a control signal from the first composite signal which is a measure of its peak amplitude, means for deriving a second control signal from the second composite signal which is a measure of its peak amplitude, means for shifting the phase of said reference pulses, and means for indicating when the amplitudes of said control signals have a predetermined relation to each other.

6. The invention according to claim 5 wherein the two means for deriving control signals comprise a pair of peak rectifiers having their output circuits connected in balanced relation.

7. In a system for determining the time relation between a transmitted electrical pulse and a reflected electrical pulse, means for producing a reference pulse having a sloping side and occurring in a known time relation to said transmitted pulse, means for producing another reference pulse having a sloping side occurring at the same time as said first sloping side but sloping in the opposite direction, means for adding said reflected pulse and said first reference pulse to give a composite signal, means for adding said reflected pulse and said second reference pulse to give a second composite signal, means for deriving a control signal from the first composite signal which is a measure of its peak amplitude, means for deriving a second control signal from the second composite signal which is a measure of its peak amplitude, and means for shifting the phase of said two reference pulses simultaneously in response to a difference in the amplitude of said control signals.

8. The invention according to claim 7 wherein said two means for deriving control signals comprise a pair of peak rectifiers having their output circutis connected in balanced relation, and wherein said last means comprises a motor and a phase shifter mechanically coupled together, said motor being connected to receive power in accordance with the output of said balanced output circuits.

9. In a system for determining the time relation between a transmitted electrical pulse and a reflected electrical pulse, means for producing a reference pulse having a sloping side and occurring in a known time relation to said first pulse, means for producing another reference pulse which is the same as the first reference pulse but of opposite polarity, means for mixing said second pulse and said first reference pulse to give an added composite signal, means for mixing said second pulse and said second reference pulse to give a second added composite signal, means for deriving a control signal from the first composite signal which is a measure of its peak amplitude, means for deriving a second control signal from the second composite signal which is a measure of its peak amplitude, and means for shifting the phase of said two reference pulses simultaneously in response to a difference in the amplitude of said control signals.

10. In a system for determining the time relation between a transmitted electrical pulse and a reflected electrical pulse, a receiver channel which will pass said reflected pulses only during the application of a gate pulse to said channel, means for producing a reference pulse having a sloping side and occurring in a known time relation to said first pulse, means for producing another reference pulse having a sloping side occurring at the same time as said first sloping side but sloping in the opposite direction, means for producing a gate pulse which occurs during the occurrence of the said sloping sides of the reference pulses, means for applying said gate pulse to said receiver channel, means for mixing said reflected pulse and said first reference pulse to give an added composite signal, means for mixing said reflected pulse and said second reference pulse to give a second added composite signal, means for deriving a control signal from the first composite signal which is a measure of its peak amplitude, means for deriving a second control signal from the second composite signal which is a measure of its peak amplitude, means for shifting the phase of said reference pulses, and means for indicating when the amplitudes of said control signals have a certain predetermined relation to each other.

11. In a system for determining the time relation between a transmitted electrical pulse and a reflected electrical pulse, a receiver channel which will pass said reflected pulses only during the application of a gate pulse to said channel, means for producing a reference pulse having a sloping side and occuring in a known time relation to said first pulse, means for producing another reference pulse having a sloping side occurring at the same time as said first sloping side but sloping in the opposite direction, means for producing a gate pulse which occurs during the occurrence of the said sloping sides of the reference pulses, switching means for applying said gate pulse to said receiver channel at the will of an operator, means for mixing said reflected pulse and said first reference pulse to give an added composite signal, means for mixing said reflected pulse and said second reference pulse to give a second added composite signal, means for deriving a control signal from the first composite signal which is a measure of its peak amplitude, means for deriving a second control signal from the second composite signal which is a measure of its peak amplitude, means for shifting the phase of said two reference pulses simultaneously, and means for indicating when the amplitudes of said control signals have a certain predetermined relation to each other.

12. In a system for determining the time relation between a transmitted electrical pulse and a reflected electrical pulse, a receiver channel which will pass said reflected pulses only during the application of a gate pulse to said channel, means for producing a reference pulse having a sloping side and occurring in a known time relation to said first pulse, means for producing another reference pulse having a sloping side occurring at the same time as said first sloping side but sloping in the opposite direction, means for producing a gate pulse which occurs during the occurrence of the said sloping sides of the reference pulses, switching means for applying said gate pulse to said receiver channel at the will of an operator, means for mixing said reflected pulse and said first reference pulse to give an added composite signal, means for mixing said reflected pulse and said second reference pulse to give a second added composite signal, means for deriving a control signal from the first composite signal which is a measure of its peak amplitude, means for deriving a second control signal from the second composite signal which is a measure of its peak amplitude, and means for shifting simultaneously the phase of said reference pulses and said gate pulse in response to a difference in the amplitude of said control signals.

13. In combination, a channel for supplying an electrical pulse, means for producing a pair of reference waves having simultaneously occurring sloping portions, and means for so mixing said electrical pulse with said sloped portions that one of the resulting composite signals increases in peak amplitude while the other resulting composite signal decreases in peak amplitude in response to a change in the phase relation of said reference waves with respect to said electrical pulse.

14. In combination, a channel for supplying an electrical pulse, means for producing a reference wave having a sloping side, means for producing another reference wave having a sloping side occurring at the same time as said first sloping side but sloping in the opposite direction, means for mixing said electrical pulse and said first reference wave to give an added composite signal, means for mixing said electrical pulse and said second reference wave to give a second added composite signal, means for deriving a control signal from the first composite signal which is a measure of its peak amplitude, means for deriving a second control signal from the second composite signal which is a measure of its peak amplitude, and means for shifting simultaneously the phase of said reference pulses with respect to said electrical pulse in response to a difference in the amplitude of said control signals.

15. In combination, a cathode ray deflecting circuit which is to be held in synchronism with a regularly recurring synchronizing pulse, means for obtaining from said deflecting circuit a pair of reference waves having simultaneously occurring sloping portions, means for so mixing said synchronizing pulse with said sloped portions that one of the resulting composite signals increases in peak amplitude while the other resulting composite signal decreases in peak amplitude in response to a change in the phase relation of said reference waves with respect to said electrical pulse, and means for utilizing the difference in said peak amplitudes for maintaining said phase relation substantially fixed.

16. In combination, a cathode ray deflecting circuit which is to be held in synchronism with a regularly recurring synchronizing pulse, means for obtaining from said deflecting circuit a pair of reference pulses having simultaneously oppositely sloped portions definitely timed with respect to the deflection produced by said circuit, means for superimposing the snychronizing pulse upon said sloped portions to produce a pair of resultant pulses, and means responsive to changes in the relative amplitudes of the peaks of said resultant pulses to maintain the time relation between said synchronizing pulses and said reference pulses substantially fixed.

17. In a pulse echo system in which recurrent pulses are transmitted and after each pulse one or more corresponding pulses are received at times dependent on the range from which the respective pulse arrives, a viewing screen, means to indicate said received pulses on said screen in space sequence corresponding to the time sequence in which they are received, separate range indicating means, means to select pulses producing one of said indications on said screen to the exclusion of other pulses producing indications on said screen, and means responsive to said selected pulses to control said separate range indicating means.

18. In a pulse echo system in which recurrent pulses are transmitted and after each pulse one or more corresponding pulses are received at times dependent on the range from which the respective pulse arrives, a viewing screen, means to indicate said received pulses on said screen an space sequence corresponding to the time sequence in which they are received, separate means for supplying range information, a pulse selector having an output circuit, means to supply said received pulses to said pulse selector, means to control said pulse selector to select a desired one of said received pulses to the exclusion of other of said pulses whereby only said selected pulse appears in said output circuit, and means responsive to said selected pulse to control said separate means for supplying range information.

19. Means at an observation point for measuring a variable distance between said point and an object distant therefrom, comprising means at said point for generating and transmitting to said object a train of pulses or waves of energy spaced apart in time, means at said point for receiving pulses from said object in response to said transmission, circuit control means upon which said received pulses are impressed, means for generating pairs of auxiliary pulses, at least one of said auxiliary pulses being generated at times bearing a variable known relation to the times of sending said first-mentioned pulses, means causing said pairs of auxiliary pulses to quantitatively vary the effect of said received pulses on said circuit control means dependent upon the time relation between their impression thereon and that of said received pulses, and servo motive means under control of said circuit control means for varying said last-mentioned time relation.

20. In a pulse echo system in which recurrent pulses are transmitted and after each pulse one or more corresponding pulses are received in response to said transmission and at times dependent on the range from which the respective pulse arrives; means for supplying range information, said means including; a pulse selector having an output circuit, means to supply said received pulses to said pulse selector, means for generating at least one auxiliary timing wave bearing a variable known time relation to the times of sending said first-mentioned pulses, means to control said pulse selector to select a desired one of said received pulses to the exclusion of other of said pulses whereby only said selected pulse appears in said output circuit, means responsive to the time relation of said selected pulse with respect to said timing wave for shifting the time relation of said timing wave to the times of sending said first-mentioned pulses, and means for deriving range information from said last-mentioned time relation.

21. In a pulse echo system in which recurrent pulses are transmitted and after each pulse one or more corresponding pulses are received at times dependent on the range from which the respective pulse arrives; means for supplying range information, said means including: a pulse selector having an output circuit, means to supply said received pulses to said pulse selector, means to control said pulse selector to select a desired one of said received pulses to the exclusion of other of said pulses, whereby only said selected pulse appears in said output circuit, means for generating pairs of auxiliary pulses at times bearing a variable known relation to the times of sending said first-mentioned pulses, and control means upon which both said selected pulses and said pairs of auxiliary pulses are impressed, said control means including means responsive to changes in the time relation of a selected pulse and a pair of said auxiliary pulses for shifting the timing of said pair of pulses to thereby vary the effect of said selected pulse on said control means dependent upon said time relation.

22. In a pulse echo system in which recurrent pulses are transmitted and after each pulse one or more corresponding pulses are received in response to said transmission and at times dependent on the range from which the respective pulse arrives; means for supplying range information, said means including: a pulse selector having an output circuit, means to supply said received pulses to said pulse selector, means for generating at least one auxiliary timing wave at times bearing a variable known time relation to the times of sending said first-mentioned pulses, said auxiliary timing wave having a sloping portion, means to control said pulse selector to select a desired one of said received pulses to the exclusion of other of said pulses whereby only said selected pulse appears in said output circuit, means for superimposing said selected pulse on said sloping portion, means responsive to the location of said selected pulse on said sloping portion for shifting the time relation of said timing wave to the times of sending said first-mentioned pulses, and means for deriving range information from said last-mentioned time relation.

23. Means at an observation point for measuring a variable distance between said point and an object distant therefrom, comprising means at said point for generating and transmitting to said object a train of pulses or waves of energy spaced apart in time, means at said point for receiving pulses from said object in response to said transmission, circuit control means upon which said received pulses are impressed, means for generating at least one auxiliary pulse, said auxiliary pulse being generated at times bearing a variable known relation to the times of sending said first-mentioned pulses, means causing said auxiliary pulse to quantitatively vary the effect of said received pulses on said circuit control means dependent upon the time relation between its impression thereon and that of said received pulses, and servo motive means under control of said circuit control means for varying said last-mentioned time relation.

24. Means at an observation point for measuring a variable distance between said point and an object distant therefrom, comprising means at said point for generating and transmitting to said object a train of pulses or waves of energy spaced apart in time, means at said point for receiving pulses from said object in response to said transmission, circuit control means upon which said received pulses are impressed, means for generating pairs of auxiliary pulses, at least one of said auxiliary pulses being generated at times bearing a variable known relation to the times of sending said first-mentionel pulses, means causing said pairs of auxiliary pulses to quantitatively vary the effect of said received pulses on said circuit control means dependent upon the time relation between their impression thereon and that of said received pulses, and servo motive means under control of said circuit control means for varying said last-mentioned time relation, said servo motive means including a motor and a phase shifter driven thereby.

References Cited in the file of this patent

UNITED STATES PATENTS

| | | |
|---|---|---|
| 1,844,950 | Finch | Feb. 16, 1932 |
| 2,150,265 | Conover | Mar. 14, 1939 |